(12) United States Patent
Shin et al.

(10) Patent No.: US 8,879,000 B2
(45) Date of Patent: Nov. 4, 2014

(54) METHOD AND SYSTEM FOR DETECTING ANALOG NOISE IN THE PRESENCE OF MOSQUITO NOISE

(75) Inventors: Jaewon Shin, Santa Clara, CA (US); Brian Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 255 days.

(21) Appl. No.: 12/976,281

(22) Filed: Dec. 22, 2010

(65) Prior Publication Data
US 2012/0162526 A1 Jun. 28, 2012

(51) Int. Cl.
*H04N 5/00* (2011.01)
*G06K 9/40* (2006.01)
*H04N 5/213* (2006.01)

(52) U.S. Cl.
CPC ................................ *H04N 5/213* (2013.01)
USPC ........... 348/607; 348/606; 382/260; 382/261; 382/266

(58) Field of Classification Search
CPC ...................................................... H04N 5/21
USPC ................... 348/607, 533, 470; 382/260, 261
See application file for complete search history.

(56) References Cited

U.S. PATENT DOCUMENTS

| | | | |
|---|---|---|---|
| 6,433,819 B1 * | 8/2002 | Li et al. | 348/180 |
| 2002/0054637 A1 * | 5/2002 | Kato | 375/240.02 |
| 2005/0265446 A1 * | 12/2005 | Yankilevich | 375/240.03 |
| 2006/0050783 A1 * | 3/2006 | Le Dinh et al. | 375/240.2 |
| 2006/0110062 A1 * | 5/2006 | Chiang et al. | 382/260 |
| 2007/0110329 A1 * | 5/2007 | Moon et al. | 382/261 |
| 2008/0037627 A1 * | 2/2008 | Tang et al. | 375/240.02 |
| 2009/0086821 A1 * | 4/2009 | Ohira | 375/240.16 |
| 2009/0167951 A1 * | 7/2009 | Chiu | 348/607 |
| 2010/0002953 A1 * | 1/2010 | Kirenko et al. | 382/268 |
| 2010/0060749 A1 * | 3/2010 | Srinivasan et al. | 348/222.1 |
| 2010/0119163 A1 * | 5/2010 | Inoue | 382/224 |
| 2010/0165207 A1 * | 7/2010 | Deng et al. | 348/620 |
| 2010/0239181 A1 * | 9/2010 | Lee et al. | 382/264 |
| 2010/0246990 A1 * | 9/2010 | Lertrattanapanich et al. | 382/260 |

* cited by examiner

*Primary Examiner* — Benjamin R Bruckart
*Assistant Examiner* — Akshay Doshi
(74) *Attorney, Agent, or Firm* — Foley & Lardner LLP

(57) ABSTRACT

A method and system are provided in which a processor, such as a video processor, may determine a flatness value for a current video picture and may adjust a mosquito noise filtering of a subsequent video picture based on the determined flatness value. The flatness value may be determined within a predetermined region of the current video picture, which may be dynamically modified by the processor. The flatness value may be associated with the presence of analog noise in the current video picture, and may be determined based on horizontal and vertical variance values determined for one or more portions of the current video picture. The processor may adjust a mosquito noise strength value of the current video picture based on the determined flatness value and may adjust the mosquito noise filtering of the subsequent video picture based on the adjusted mosquito noise strength value of the current video picture.

23 Claims, 5 Drawing Sheets

METHOD AND SYSTEM FOR DETECTING ANALOG NOISE IN THE PRESENCE OF MOSQUITO NOISE

CROSS-REFERENCE TO RELATED APPLICATIONS/INCORPORATION BY REFERENCE

Not Applicable.

FIELD OF THE INVENTION

Certain embodiments of the invention relate to the processing of video signals. More specifically, certain embodiments of the invention relate to a method and system for detecting analog noise in the presence of mosquito noise.

BACKGROUND OF THE INVENTION

The presence of analog noise in a video picture may cause the detection and reduction of digital noise in the video picture to produce artifacts that may be visually unpleasing to a user.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for detecting analog noise in the presence of mosquito noise, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for detecting analog noise in the presence of mosquito noise. Various embodiments of the invention may comprise a processor, such as a video processor, for example, that may determine a flatness value for a current video picture and that may adjust a mosquito noise filtering of a subsequent video picture based on the determined flatness value. The flatness value may be associated with the presence of analog noise in the current video picture. The flatness value may be determined within a predetermined region of the current video picture. The predetermined region may be dynamically modified by the processor. The flatness value may be based on horizontal and vertical variance values determined for one or more portions of the current video picture. The processor may adjust a mosquito noise strength value of the current video picture based on the determined flatness value and may adjust the mosquito noise filtering of the subsequent video picture based on the adjusted mosquito noise strength value of the current video picture.

Analog noise is typically distributed throughout a video picture. Digital noise, such as mosquito noise, for example, tends to cluster around strong edges and is typically detected and filtered locally. When mosquito noise is detected and filtered, the noise that is close to the edges is cleaned up, including the analog noise, resulting in a "halo" effect near the edges. The presence of a "halo" may be more visually unpleasing to a user than the mosquito noise that was filtered out. In such instances, the processor may be operable to detect the presence of the analog noise and to back off when filtering the mosquito noise.

The processor may be operable to detect the presence of analog noise in different ways. One way to measure the presence of analog noise is to measure the flatness of the video picture. When a video picture comprises analog noise, a flat region is not likely to occur in the video picture. On the other hand, in video pictures that comprise digital noise, flat regions are likely to occur as a result of the quantization associated with generating digitally encoded video pictures. Therefore, the processor may utilize flatness information to detect the presence of analog noise and adapt the filtering of mosquito noise accordingly.

Figure 1:
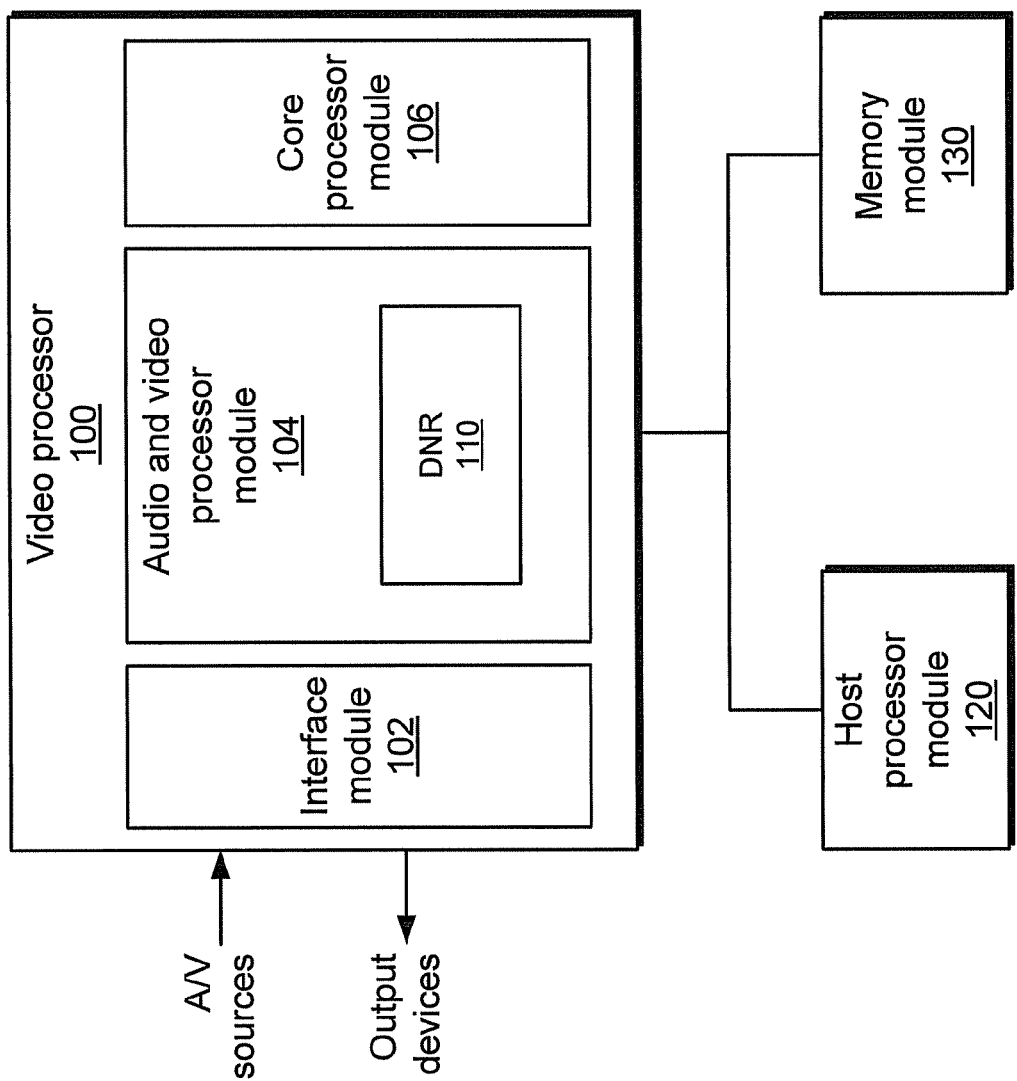
FIG. 1 is a block diagram that illustrates a system-on-chip that is operable to detect analog noise in the presence of mosquito noise, in accordance with an embodiment of the invention.

FIG. 1 is a block diagram that illustrates a system-on-chip that is operable to detect analog noise in the presence of mosquito noise, in accordance with an embodiment of the invention. Referring to FIG. 1, there is shown an SoC 100, a host processor module 120, and a memory module 130. The SoC 100 may comprise suitable logic, circuitry, code, and/or interfaces that may be operable to receive and/or process one or more signals that comprise video content. Examples of signals comprising video content that may be received and processed by the SoC 100 include, but need not be limited to, composite, blanking, and sync (CVBS) signals, separate video (S-video) signals, high-definition multimedia interface (HDMI) signals, component signals, personal computer (PC) signals, source input format (SIF) signals, and red, green, blue (RGB) signals. Such signals may be received by the SoC 100 from one or more audio visual (A/V) sources communicatively coupled to the SoC 100.

The SoC 100 may generate one or more output signals that may be provided to one or more output devices for display, reproduction, and/or storage. For example, output signals from the SoC 100 may be provided to display devices such as cathode ray tubes (CRTs), liquid crystal displays (LCDs), plasma display panels (PDPs), thin film transistor LCDs (TFT-LCDs), plasma, light emitting diode (LED), Organic LED (OLED), or other flatscreen display technology.

The host processor module 120 may comprise suitable logic, circuitry, code, and/or interfaces that may be operable to control and/or configure the operation of the SoC 100. For example, values and/or other information, including but not limited to configuration data, may be provided to the SoC 100 by the host processor module 120 at various times during the operation of the SoC 100. The memory module 130 may comprise suitable logic, circuitry, code, and/or interfaces that may be operable to store information associated with the operation of the SoC 100. For example, the memory module 130 may store intermediate values that result during the processing of video data.

The SoC 100 may comprise an interface module 102, an audio and video processor module 104, and a core processor module 106. The SoC 100 may be implemented as a single integrated circuit comprising the components listed above. The interface module 102 may comprise suitable logic, circuitry, code, and/or interfaces that may be operable to receive multiple signals that comprise video. Similarly, the interface module 102 may be operable to communicate one or more signals comprising video content to output devices communicatively coupled to the SoC 100.

The core processor module 106 may comprise suitable logic, circuitry, code, and/or interfaces that may be operable to control and/or configure the operation of the SoC 100. For example, the core processor module 106 may be operable to control and/or configure operations of the SoC 100 that are associated with processing video content. In some embodiments of the invention, the core processor module 106 may comprise memory (not shown) that may be utilized in connection with the operations performed by the SoC 100. For example, the core processor module 106 may comprise memory that may be utilized during the processing of audio data, video data, and/or graphics data by the audio and video processor module 104.

The audio and video processing module 104 may comprise suitable logic, circuitry, code, and/or interfaces that may be operable to process audio data, video data, and/or graphics data. The audio and video processing module 104 may be operable to support multiple formats for video data, audio data, and/or graphics data, including multiple input formats and/or multiple output formats.

The audio and video processing module 104 may comprise a digital noise reduction (DNR) module 110. The DNR module 110 may comprise suitable logic, circuitry, code, and/or interfaces that may be operable to detect and/or reduce block noise, mosquito noise, and/or digital contours, for example. The DNR module 110 may be operable to detect the presence of analog noise, and to adapt or adjust the filtering of mosquito noise accordingly.

In operation, the SoC 100 may receive one or more video signals through the interface module 102. When processing video pictures associated with one of those video signals, the DNR module 110 may determine a flatness value for a current video picture and may adjust the mosquito noise filtering of a subsequent video picture based on the determined flatness value. The flatness value may be associated with the presence of analog noise in the current video picture. In one embodiment of the invention, the DNR module 110 may adjust a mosquito noise strength value of the current video picture based on the determined flatness value. Moreover, the DNR module 110 may adjust the mosquito noise filtering of the subsequent video picture based on the adjusted mosquito noise strength value of the current video picture.

The flatness value may be determined within a predetermined region of the current video picture. In this regard, the predetermined region may be defined by the contents of one or more registers (not shown) in the SoC 100. Accordingly, the SoC 100 may be operable to dynamically modify the predetermined region of the current video picture by modifying the contents of the registers that are utilized to define the predetermined region. The DNR module 110 may determine horizontal and vertical flatness or variance values for one or more portions of the current video picture and may utilize those values to determine the flatness value.

Figure 2:
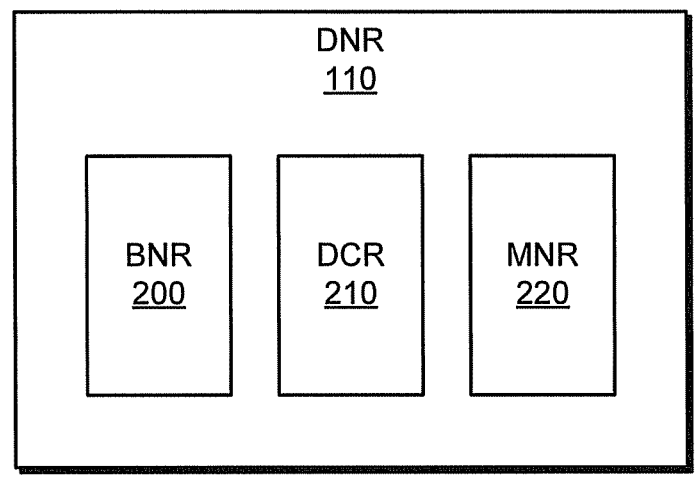
FIG. 2 is a block diagram that illustrates an exemplary digital noise reduction module, in accordance with an embodiment of the invention.

FIG. 2 is a block diagram that illustrates an exemplary digital noise reduction module, in accordance with an embodiment of the invention. Referring to FIG. 2, there is shown the DNR module 110 described above with respect to FIG. 1. The DNR module 110 may comprise a block noise reduction (BNR) module 200, a digital contour reduction (DCR) module 210, and a mosquito noise reduction (MNR) module 220.

The BNR module 200 may comprise suitable logic, circuitry, code, and/or interfaces that may be operable to detect and/or remove block edges in a video picture. The BNR module 200 may be operable to remove vertical block edges utilizing horizontal filters and horizontal block edges utilizing vertical filters. The BNR module 200 may operate on pixel luma information.

The DCR module 210 may comprise suitable logic, circuitry, code, and/or interfaces that may be operable to detect and/or remove low-level contours from low-bit rate video. The DCR module 2110 may operate on both pixel luma information and pixel chroma information.

The MNR module 220 may comprise suitable logic, circuitry, code, and/or interface that may be operable to detect and/or remove mosquito noise in a video picture. The MNR module 220 may operate on pixel luma information. The MNR module 220 may be operable to detect the presence of analog noise in the video picture by determining a flatness value associated with the video picture. Moreover, the MNR module 220 may be operable to adapt or adjust the reduction or filtering of the mosquito noise based on the flatness value.

Figure 3:
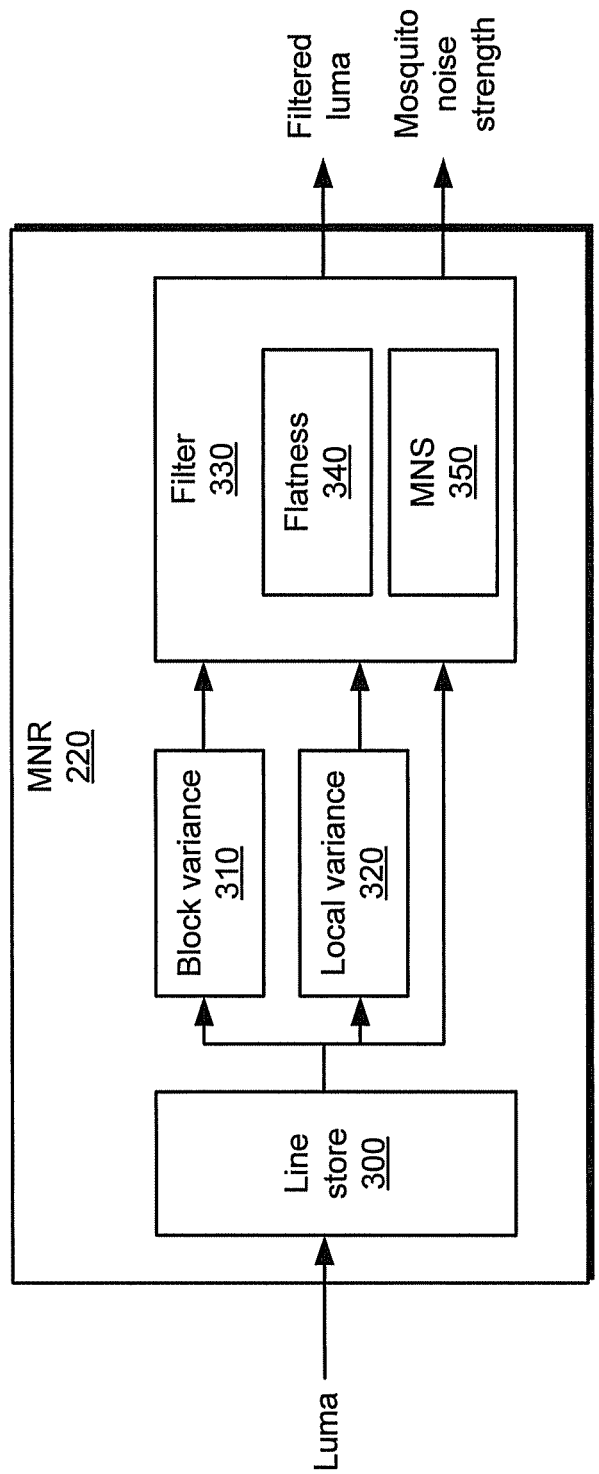
FIG. 3 is a block diagram that illustrates an exemplary mosquito noise reduction module, in accordance with an embodiment of the invention.

FIG. 3 is a block diagram that illustrates an exemplary mosquito noise reduction module, in accordance with an embodiment of the invention. Referring to FIG. 3, there is shown, in more detail, the MNR module 220 described above with respect to FIG. 2. The MNR module 220 may comprise a line store module 300, a block variance module 310, a local variance module 320, and a filter module 330. The filter module 330 may comprise a flatness module 340 and a mosquito noise strength (MNS) module 350.

The line store module 300 may comprise suitable logic, circuitry, code, and/or interfaces that may be operable to receive, store, and/or arrange luma information from multiple pixels of a video picture. The line store module 300 may provide the pixel luma information to the block variance module 310, the local variance module 320, and the filter module 330 for further processing.

The block variance module 310 may comprise suitable logic, circuitry, code, and/or interfaces that may be operable to determine horizontal and vertical variance or flatness values for one or more portions of a video picture. For example, the block variance module 310 may determine a horizontal edge strength value, H_VAR, and a vertical edge strength value, V_VAR, both of which may be determined utilizing a window of the video picture that is typically larger than an 8×8 block of pixels.

The local variance module 320 may comprise suitable logic, circuitry, code, and/or interfaces that may be operable to determine a local variance value, LOCAL_VAR, for one or more portions of a video picture. The local variance module 320 may determine LOCAL_VAR based on a window of the video picture that is typically smaller than the window used in determining H_VAR and V_VAR.

The filter module 330 may comprise suitable logic, circuitry, code, and/or interfaces that may be operable to filter the pixel luma information based on H_VAR, V_VAR, and LOCAL_VAR. In this regard, the filter module 300 may generate filtered pixel luma information, which may be provided as an output from the MNR module 220.

The flatness module 340 in the filter module 330 may be operable to detect the presence of analog noise in a video picture based on H_VAR and V_VAR provided by the block variance module 310. In this regard, the flatness module 340 may determine a flatness value and may provide the flatness value to the MNS module 350 in the filter module 330.

The MNS module 350 may be operable to determine a mosquito noise strength value that may be utilized by the MNR module 220, and/or by another portion of the DNR module 110, to adjust the operation of the MNR module 220, including the filtering of pixel luma information from subsequent video pictures. The mosquito noise strength value or MNS may be based on the pixel luma information, H_VAR, V_VAR, and LOCAL_VAR, and may be provided as an output from the MNR module 220.

The MNS module 350 may be operable to receive the flatness value from the flatness module 340 and to adjust the mosquito noise strength value based on the flatness value. For example, when the flatness value indicates that a strong analog noise is present in the video picture, the mosquito noise strength value may be reduced to back off when filtering subsequent video pictures. By backing off in the amount of mosquito noise filtering applied, the MNR module 220 may back avoid producing a "halo" effect near edges in the video picture.

Figure 4:
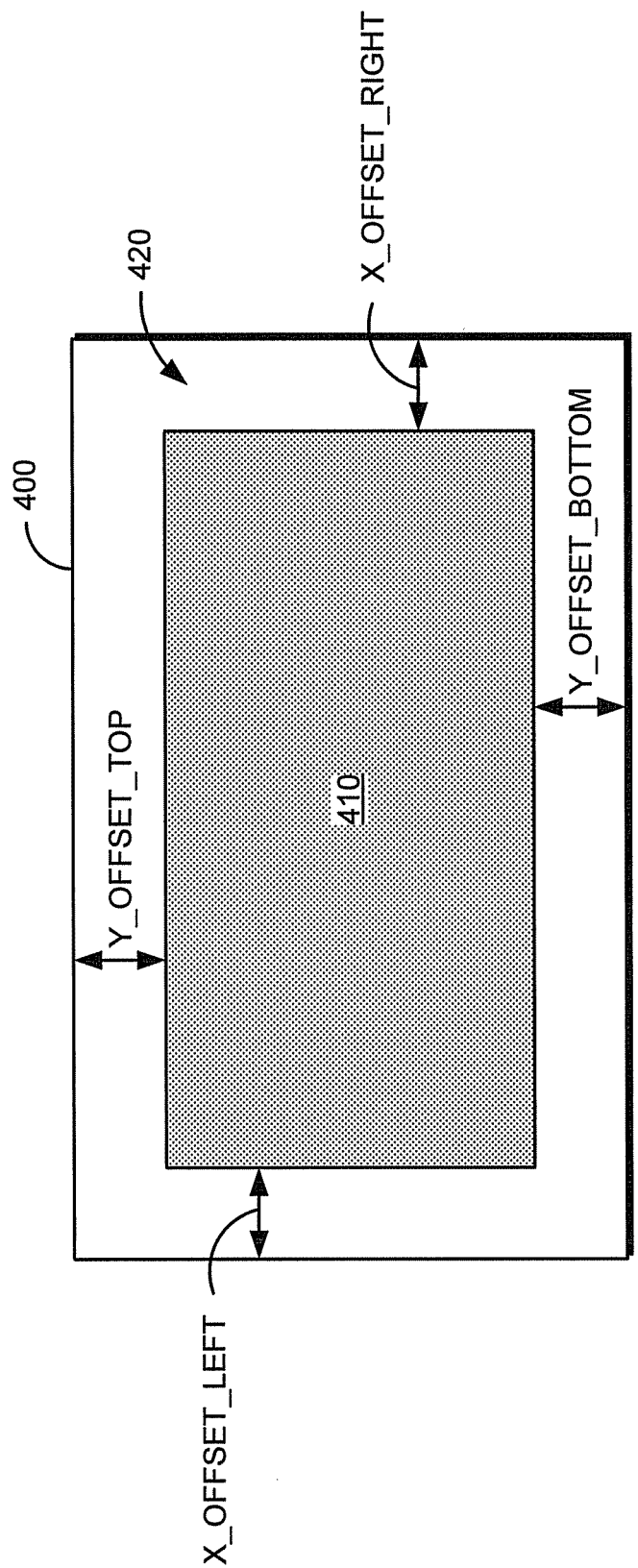
FIG. 4 is a diagram that illustrates a predetermined region from which to determine a flatness value in a video picture, in accordance with an embodiment of the invention.

FIG. 4 is a diagram that illustrates a predetermined region from which to determine a flatness value in a video picture, in accordance with an embodiment of the invention. Referring to FIG. 4, there is shown a video picture 400 comprising a region 410 and a region 420. The region 410 is to be utilized by the flatness module 340 described above to determine the flatness value of the video picture 400. The region 410 may be defined by two vertical offset values, Y_OFFSET_TOP and Y_OFFSET_BOTTOM, and by two horizontal offset values, X_OFFSET_RIGHT and X_OFFSET_LEFT. The vertical and horizontal offset values may be stored in registers in the SoC 100. The SoC 100 may dynamically modify the region 410 during operation by changing the content of those registers. The region 420 may represent an estimate of a letterbox/pillarbox region associated with the video picture 400 and may not be considered when determining the flatness value.

The flatness module 340 may utilize the vertical and horizontal offset values to determine the flatness value of a video picture and, therefore, detect the presence of analog noise in that video picture. Below is shown an exemplary high level description or pseudocode of an algorithm that may be utilized to determine the flatness value associated with a video picture:

```
FLAT = START_FLAT;
LUMA_VALUE = IN(X,Y);
IF ( (X >= X_OFFSET_LEFT) &&
   (X <= WIDTH -X_OFFSET_RIGHT) &&
   (Y >= Y_OFFSET_TOP) &&
   (Y <= HEIGTH -Y_OFFSET_BOTTOM) &&
   (LUMA_VALUE > BLACK_LEVEL)) {
     FLAT = MIN(FLAT, H_VAR + V_VAR) ;
   }
``` where FLAT is the flatness value, START_FLAT is a starting flatness value that may be based on a maximum value of a register in which FLAT is to be stored, LUMA_VALUE is the pixel luma information for a current pixel with coordinates X and Y, WIDTH is the width in pixels of the video picture 400, HEIGHT is the height in pixels of the video picture 400, and BLACK_LEVEL is a luma value associated with black pixels. The flatness module 340 may perform the above-described operation over the region 410 and may determine a flatness value that may be utilized to adjust the filtering of mosquito noise in subsequent video pictures.

The exemplary high level description or pseudocode described above has been provided by way of illustration and not of limitation. Other algorithms may be utilized that may enable the MNR module 220, and/or other module in the DNR module 110, to detect the presence of analog noise and to provide an indication of such presence to the MNR module 220 such that the mosquito noise filtering that is to be applied to subsequent video pictures may be adjusted.

Figure 5:
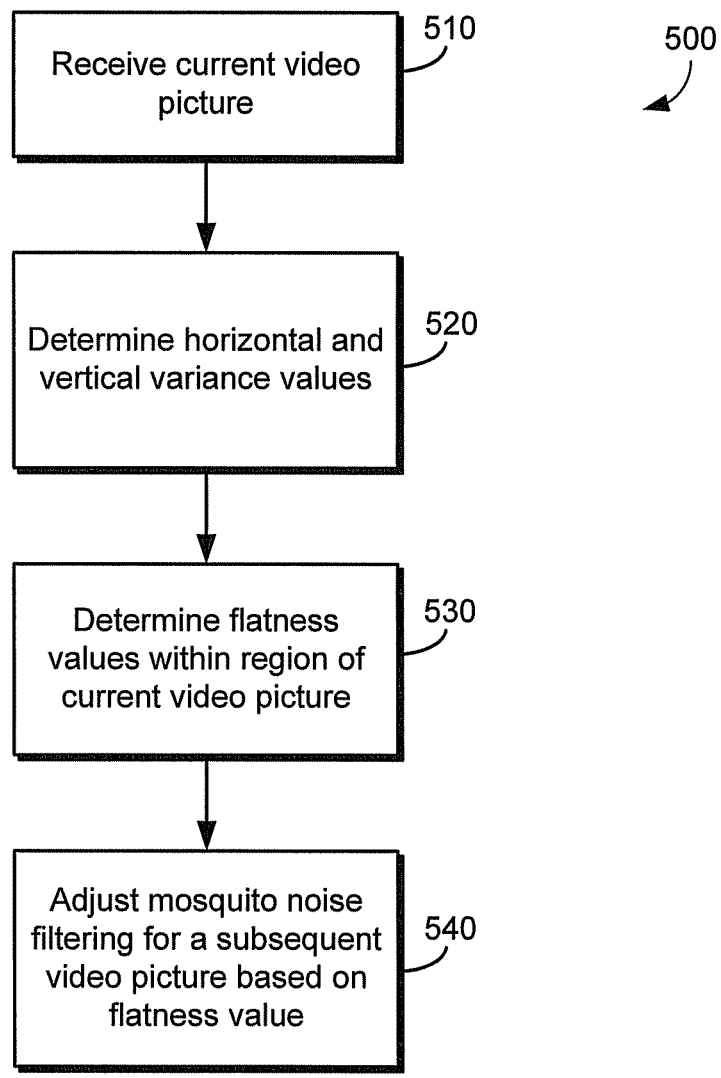
FIG. 5 is a flow chart that illustrates exemplary steps to detect analog noise in the presence of mosquito noise, in accordance with an embodiment of the invention.

FIG. 5 is a flow chart that illustrates exemplary steps to detect analog noise in the presence of mosquito noise, in accordance with an embodiment of the invention. Referring to FIG. 5, there is shown a flow chart 500 in which, at step 510, the MNR module 220 described above with respect to FIGS. 2 and 3, may receive a current video picture. In this regard, the line store module 300 in the MNR module 220 may receive the luma information of the pixels in the current video picture. At step 520, the block variance module 310 may determine H_VAR and H_VAR and may provide those values to the filter module 330.

At step 530, the flatness module 340 in the filter module 330 may utilize H_VAR and V_VAR from the block variance module 310, the pixel luma information from the line store module 300, and the vertical and horizontal offset values described above, and may determine the flatness value associated with the current video picture.

At step 540, the flatness module 340 may provide the flatness value to the MNS module 350, which in turn may adjust the mosquito noise strength value based on the flatness value. Once adjusted, the mosquito noise strength value may be utilized by the MNR module 220, and/or by other module in the DNR module 110, to adjust the amount of mosquito noise filtering that may be applied to subsequent video pictures.

Various embodiments of the invention relate to a processor, such as the SoC 100 described above with respect to FIG. 1, which may be operable to determine a flatness value for a current video picture. The flatness value may be determined by, for example, the MNR module 220 in the DNR module 110 of the SoC 100, as described above with respect to FIGS. 1-3. The SoC 100 may be operable to adjust a mosquito noise filtering of a subsequent video picture based on the determined flatness value of the current video picture. The determined flatness value may be associated with the presence of analog noise in the current video picture.

The SoC 100 may be operable to determine a horizontal variance value and/or a vertical variance value for one or more portions of the current video picture. For example, the block variance module 310 in the MNR module 220 may be utilized to determine the horizontal and vertical variance values. The determined flatness value may be based on the determined horizontal and/or vertical variance values for the one or more portions of the current video picture.

The SoC 100 may be operable to determine the flatness value for the current video picture within a predetermined region of the current video picture. The SoC 100 may be operable to dynamically modify the predetermined region of the current video picture from which the flatness value is to be determined. The predetermined region of the current video picture may be horizontally defined by a right offset value and a left offset value, such as X_OFFSET_RIGHT and X_OFFSET_LEFT, respectively, described above with respect to FIG. 4. The predetermined region of the current video picture may be vertically defined by a top offset value and a bottom offset value, such as Y_OFFSET_TOP and Y_OFFSET_BOTTOM, respectively, also described above with respect to FIG. 4.

The SoC 100 may be operable to adjust a mosquito noise strength value of the current video picture based on the determined flatness value. The mosquito noise strength value may be determined and adjusted by, for example, the MNS module 350 described above with respect to FIG. 3. In this regard, the SoC 100 may reduce the mosquito noise strength value based on the determined flatness value. Moreover, the SoC 100 may adjust the mosquito noise filtering of the subsequent video picture based on the adjusted mosquito noise strength value of the current video picture In another embodiment of the invention, a non-transitory machine and/or computer readable storage and/or medium may be provided, having stored thereon a machine code and/or a computer program having at least one code section executable by a machine and/or a computer, thereby causing the machine and/or computer to perform the steps as described herein for detecting analog noise in the presence of mosquito noise.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   determining, by a processor, a flatness value for a current video picture based on a window variance value related to one or more portions of the current video picture, the flatness value indicating a strength of analog noise in the current video picture; and
   reducing an amount of a mosquito noise filtering of a subsequent video picture in response to the flatness value for the current video picture.

2. The method of claim 1, further comprising determining, by the processor, a horizontal variance value for the one or more portions of the current video picture.

3. The method of claim 1, wherein the amount of a mosquito noise filtering of a subsequent video picture is based upon a mosquito noise strength value, wherein the mosquito noise strength value is adjusted based upon the flatness value.

4. The method of claim 1, further comprising determining, by the processor, the flatness value for the current video picture within a predetermined region of the current video picture.

5. The method of claim 1, further comprising, by the processor:
   adjusting a mosquito noise strength value of the current video picture based on the flatness value; and
   adjusting the mosquito noise filtering of the subsequent video picture based on the mosquito noise strength value of the current video picture.

6. The method of claim 1, further comprising determining, by the processor, a vertical variance value for the one or more portions of the current video picture.

7. The method of claim 4, comprising dynamically modifying the predetermined region of the current video picture.

8. The method of claim 4, wherein the predetermined region of the current video picture is horizontally defined by a right offset value and a left offset value.

9. The method of claim 4, wherein the predetermined region of the current video picture is vertically defined by a top offset value and a bottom offset value.

10. The method of claim 5, wherein adjusting the mosquito noise strength value comprises reducing the mosquito noise strength value when the window variance value indicates analog noise in the current video picture.

11. A system, comprising:
    a memory module; and
    a processor coupled to the memory module and configured to:
    determine a flatness value for a current video picture based on at least one variance value of a window in the current video picture, the flatness value indicating a strength of analog noise in the current video picture; and
    reduce an amount of mosquito noise filtering of a subsequent video picture in response to the flatness value for the current video picture indicating analog noise in the current video picture.

12. The system of claim 11, wherein the processor is further configured to determine a horizontal variance value for one or more portions of the current video picture.

13. The system of claim 11, wherein the flatness value is associated with either a flat region that occurs as a result of quantization associated with digital encoding or analog noise being present in the current video picture.

14. The system of claim 11, wherein the processor is further configured to determine the flatness value for the current video picture within a predetermined region of the current video picture.

15. The system of claim 11, wherein the processor is further configured to:
    determine the variance value of the current video picture;
    adjust a mosquito noise strength value of the current video picture based on the variance value; and
    adjust the mosquito noise filtering of the subsequent video picture based on the mosquito noise strength value of the current video picture.

16. The system of claim 12, wherein the processor is further configured to determine a vertical variance value for one or more portions of the current video picture.

17. The system of claim 14, wherein the processor is further configured to dynamically modify the predetermined region of the current video picture.

18. The system of claim 14, wherein the predetermined region of the current video picture is horizontally defined by a right offset value and a left offset value.

19. The system of claim 14, wherein the predetermined region of the current video picture is vertically defined by a top offset value and a bottom offset value.

20. The system of claim 15, wherein the processor is further configured to reduce the mosquito noise strength value when the variance value indicates analog noise in the current video picture.

21. A method, comprising:
   determining, by a processor, a flatness value for a current video picture based on a window variance value, the flatness value indicating a strength of analog noise in the current video picture;
   when detecting strong analog noise in the current video picture based on the flatness value, reducing, by the processor, an amount of mosquito noise filtering of the current video picture and a subsequent video picture; and
   increasing, by the processor, the amount of mosquito noise filtering of the current video picture and the subsequent video picture in response to detecting weak analog noise in the current video picture based on the flatness value.

22. The method of claim 21, further comprising, by the processor:
   determining a horizontal variance value for one or more portions of the current video picture; and
   determining a vertical variance value for one or more portions of the current video picture.

23. The method of claim 21, further comprising, by the processor:
   adjusting a mosquito noise strength value of the current video picture based on the window variance value; and
   adjusting the mosquito noise filtering of the subsequent video picture based on the mosquito noise strength value of the current video picture.

* * * * *